Patented July 12, 1938

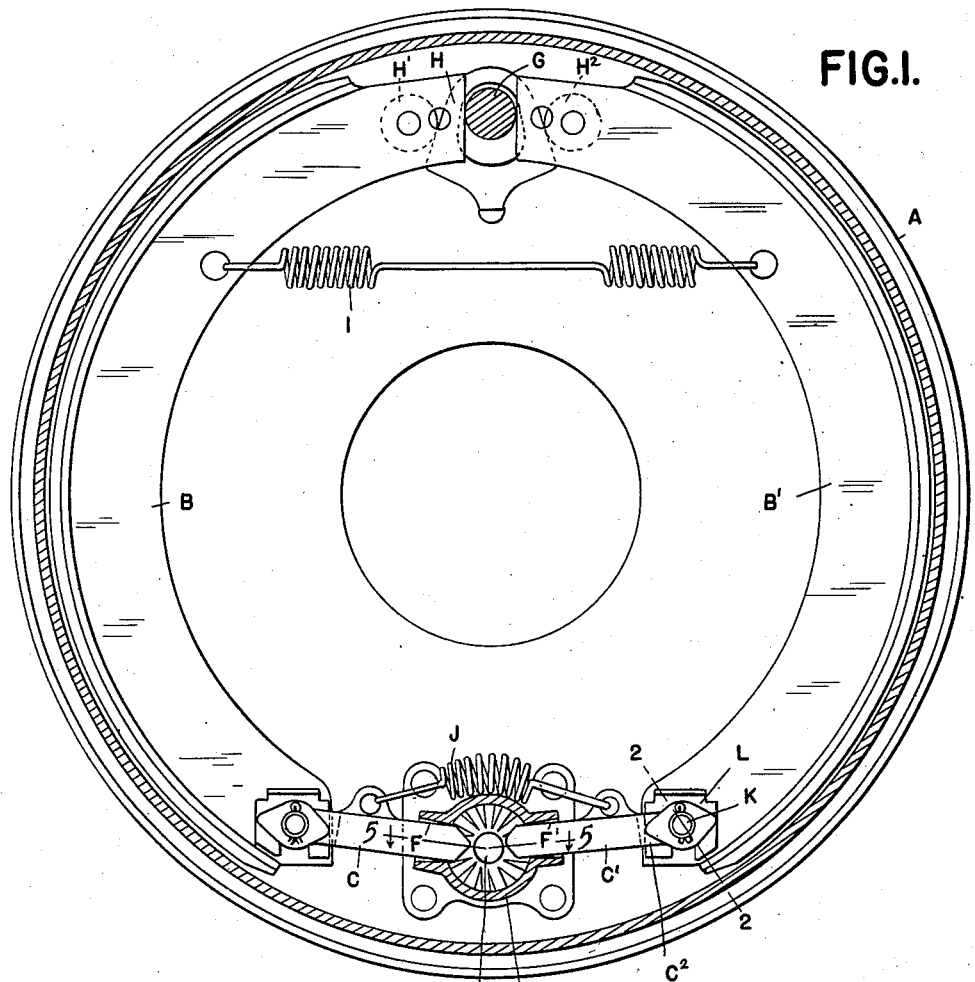

2,123,618

UNITED STATES PATENT OFFICE 2,123,618

BRAKE

John William White, South Bend, Ind., assignor to Kelsey-Hayes Wheel Company, Detroit, Mich., a corporation of Delaware Application June 22, 1936, Serial No. 86,667

2 Claims. (Cl. 188—79.5)

The invention relates to vehicle wheel brakes of that type in which segmental brake shoes engaging opposite sides of the internal surface of a brake drum are anchored by thrust rods or links extending from the ends of the shoes and rockably engaging a central bearing. The braking pressure is applied by a wedge movable radially outwardly between bearings on the opposite ends of the shoes thereby rocking the same into engagement with the surface of the drum. To provide for taking up wear the central bearing for the thrust rods is of conical form and is arranged within a housing which is apertured for the passage of the rods thereinto. This housing holds the rods from lateral displacement, while the cone is adjustable in the housing to act as a wedge for moving said rods axially outward. The usual method of effecting adjustment is to first move the cone a sufficient amount to take up all clearance between the shoes and the brake drum and then to adjust the cone backward a predetermined amount to give the desired clearance.

With certain constructions of this type which have heretofore been made, there is a stop pin extending between the wedge-operated ends of the brake shoes limiting the inward movement thereof. Also, with certain constructions the ends of the shoes are fashioned to embrace this pin so as to pivot thereon during adjustment by the thrust rods. However, with such construction the movement of the shoe towards the drum at the thrust rod end is considerably greater than that at the opposite or wedge-operated end. Consequently, if the wear on the shoe is uniform throughout its length, adjustment by the thrust rods will take up more of the clearance at the adjacent end of the shoe than at the opposite end. This is undesirable for in the actual application of the brake the shoes are operated from the opposite or wedge end and if there is a greater clearance there than at the thrust rod end, a greater amount of pedal motion will be required to take up the lost motion.

It is the object of the present invention to provide an adjustment means through which both ends of the shoe are adjusted substantially equally to bring the entire braking surface in contact with the drum. Thus, when the cone is adjusted for clearance this clearance will be no greater at the wedge end of the shoe than at the opposite end thereof. It is another object of the invention to obtain a construction in which the shoes and thrust rods are normally in rigid relation to each other during the application of braking pressure so that said shoes pivot at the point of bearing of the rods on the cone. At the same time, the construction is such as to permit an angular adjustment of the thrust rod with respect to the shoe under the pressure of the cone during adjustment for clearance. With these objects in view, the invention consists in the construction as hereinafter set forth.

In the drawing:

Figure 1 is a side elevation of the brake shoes and connected parts, indicating in dotted lines the inner surface of the brake drum;

Figure 2 is a section on line 2—2 of Figure 1;

Figure 3 is a view similar to Figure 1 showing a modified construction;

Figure 4 is a section on line 4—4 of Figure 3, and

Figure 5 is a section on line 5—5 of Figure 1.

As illustrated A is the stationary braking head; B and B' are the brake shoes; C and C' the thrust rods respectively connected to the ends of the shoes B and B'. D is the bearing cone; E the housing therefor having the apertures F and F' through which the rods C and C' enter to engage the cone. G is the limit pin between the opposite ends of the shoes; H the wedge engaging bearings H', H² on the shoes to actuate the same. I is a spring for normally retracting the shoes against the limit pin G, and J is a spring connected to the thrust rods C and C' and also bearing upon the housing E, said spring serving to hold said thrust rods in engagement with the cone D and also to support the shoes B and B'.

The rods C and C' are respectively attached to the shoes B and B', preferably by bifurcating the outer ends of said rods as indicated at C² so as to embrace the web B² of the shoe and then connecting these parts by a pivot pin K. Pivotal movement is, however, normally prevented by friction which is developed by a spring washer L arranged between one of the furcations C² and the web B². The amount of friction is such that under normal operation of the shoes to apply braking pressure the rods will remain rigid therewith and the pivotal point will be at the bearing upon the cone. Thus, when breaking pressure is relieved and the springs I and J retract the shoes, all portions of the braking surface will be separated from the drum. The opposite ends of the shoes which engage the limit pin G are parallel with each other and tangent to the surface of said pin, instead of embracing the pin as with certain constructions heretofore used. This permits of radial movement of said shoes with respect to said pin when actuated by adjustment pressure.

The cone D is provided with a threaded shank engaging a correspondingly threaded bearing in the housing E so that by rotation in said bearing, said cone will be moved axially to wedge in between the thrust rods C and C'. The pressure of the rods is applied to the shoes moving the same outward to first contact the heel portions thereof with the drum and to then move them parallel to the drum surface. The pin G prevents movement of the opposite ends of the shoes further towards each other but permits said ends to travel radially outward until limited by contact of the braking surface at that end with the inner surface of the drum. Such radial movement cannot be accomplished without an angular movement of the rods C and C' with respect to the shoes B and B', but the adjustment pressure is sufficient to overcome the friction of the spring washer L so that there will be a slight turning on the pivot K. After such adjustment is made the shoe and rod again act as an integral construction transferring the pivot to the bearing upon the cone. It will be understood that after such adjustment is made suitable clearance between the shoe and drum may be provided by slightly retracting the cone D, or the adjustment may be made while pressure is applied to the opposite ends of the shoes through the wedge H so that retraction of the wedge will provide clearance.

In Figures 3 and 4, I have shown a modification in which a link M is also arranged between the furcations C² to pivotally engage the pin K and to extend radially inward therefrom. This link is slotted for engagement with the pin so as to permit radial adjustment. It is also provided at its inner end with a square aperture M' which engages a pin N rigid with the head A. A slight clearance between this pin and one of the walls of the aperture permits a radial movement such as required for the normal movement of the brake shoe when braking pressure is applied thereto. The friction of the spring washer L normally holds the link M from relative movement with respect to the shoe, but during adjustment under the higher pressure the friction is overcome and this link is permitted to move radially to compensate for wear. Thus, with this modified construction as with the one previously described, there will be no relative movement of the parts clamped by the spring washer L during the normal application of the brakes, but only during adjustment through the medium of the cone D.

What I claim as my invention is:

1. A brake comprising a brake drum, a shoe within said drum, a thrust rod extending from one end of said shoe, a housing apertured for the passage of said thrust rod therein, a conical member within said housing forming a pivot bearing for the end of said shoe, said conical member being adjustable within said housing to change the position of said pivot bearing, a pivotal connection between said thrust rod and shoe, and friction means for normally holding said rod and shoe in rigid relation adapted to yield under adjustment pressure to change the angular relation of said shoe and rod.

2. A brake comprising a brake drum, a shoe within said drum having a web portion, a thrust rod extending from one end of said shoe and bifurcated to embrace said web portion, a pivot pin connecting said bifurcated end and web, a link having a slotted engagement with said pivot pin and arranged between one of the furcations and said web, said link extending radially with respect to said drum, an anchor pin for engaging the inner end of said link providing a slight clearance, a resilient washer between one of the furcations of said rod and said web exerting friction to normally hold said shoe and rod in rigid relation, a housing apertured for the passage of said rod therein, a conical pivot bearing for the end of said rod adjustable in said housing to vary the position of said pivot and to take up wear in the shoe, the adjustment pressure being sufficient to overcome the friction of said resilient washer whereby said shoe is moved outward with respect to said link and is changed in angular relation to said rod.

JOHN WILLIAM WHITE.